United States Patent [19]

Angerame

[11] 4,096,488

[45] Jun. 20, 1978

[54] MODULAR STYLUS ASSEMBLY

[76] Inventor: Paul Angerame, 88-47 198th St., New York, N.Y. 11423

[21] Appl. No.: 770,288

[22] Filed: Feb. 22, 1977

[51] Int. Cl.$^2$ .............................................. G01G 15/06

[52] U.S. Cl. ................................ 346/139 C; 346/155; 346/165; 400/120; 400/124

[58] Field of Search ............. 346/139 C, 139 R, 76 R, 346/165, 155, 150; 219/216; 197/1 R

[56] References Cited

U.S. PATENT DOCUMENTS

| | | | |
|---|---|---|---|
| 3,893,128 | 7/1975 | Bauerlen | 346/139 C X |
| 3,965,479 | 6/1976 | Sakamoto | 346/139 C |

*Primary Examiner*—Joseph W. Hartary

*Attorney, Agent, or Firm*—Herbert L. Lerner

[57] ABSTRACT

A modular stylus assembly for printing on electrosensitive sheets includes, in combination, a print-head module having a first wall, a pair of spaced second walls extending from the first wall and defining a channel therebetween, and a multiplicity of stylus wires extending rectilinearly and in parallel alignment through the second walls and within the channel alongside the first wall, and a connector module receivable in the channel and includes a multiplicity of alternating electrically conductive and electrically insulating wafers respectively disposed in planes extending through the pair of spaced second walls, the electrically conductive wafers being spaced from one another by the electrically insulating wafers a distance corresponding substantially to the spacing between the parallel stylus wires whereby the electrically insulating wafers of a connector module received in the channel are respectively in electrically conductive engagement with the stylus wires, the connector module having means for selectively electrically energizing the electrically conductive wafers and the stylus wires.

11 Claims, 8 Drawing Figures

MODULAR STYLUS ASSEMBLY

BACKGROUND OF THE INVENTION

This invention relates in general to a printing stylus for printing data electrically on electrosensitive print medium. More specifically, the present invention of the instant application relates to a print head of modular construction essentially comprised of a plurality of electrode tips which, when selectively energized, burn alphanumeric patterns of dots into the sensitized surface of the print medium as the head is moved past the print medium, or when the print medium is moved passed the print head. Print heads of this type are included in classes 219/216 and 346/139c of the U.S. Patent Office classification system.

DESCRIPTION OF THE PRIOR ART

Different forms of electrosensitive printing apparatus have been developed heretofore for the reproduction on sensitized paper of information patterns, in alphanumeric or pictoral form. Generally, an electrosensitive printer can be formed of one or more writing tips or heads, each of which having an array of electrically conductive stylus wires which can be selectively energized in accordance with the character to be printed. When a selected stylus wire is energized or pulsed with a voltage adjacent a sensitized paper having successive layers of black dye and an electrically conductive sensitized substance, a hole is burnt through the conductive sensitized surface into the black dye larger on the paper, when an electric circuit is completed between the selected stylus wire, the sensitized surface layer, and a ground plate in continuous contact with the sensitized surface layer. In general applications, a single writing tip or head composed of a number of stylus wires can be employed in the art of typewriters and a linear array of a series of heads can be employed in the art of printers. Examples of electrosensitive printer styli as well as supplementary information pertaining to printer apparatus may be found in U.S. Pats. No. 3,300,017 and 3,167,166.

Often, as in the stylus assembly described in U.S. Pat. No. 3,978,494, the amount of stylus wire that is usable for printing is very small compared to the amount of stylus wire used for interconnection to drive circuits or a service loop connector. Stylus wires are typically made of costly materials, such as tungsten, chrome-nickel alloy, or platinum alloys, and represent a large portion of the material cost of a print head. Therefore it is an object of the invention to provide a modular stylus assembly wherein interconnection is effected as close to the writing tip as possible so that the maximal amount of stylus material is available for printing and a minimum amount used for interconnection to drive circuits. Furthermore, most stylus arrangements are intended for a specific printer system and have limited application in electrosensitive printers of differing mechanisms or print systems. Accordingly, it is another object of the invention to provide a modular stylus assembly which is applicable to various types of electrosensitive printers having different mechanisms or print systems.

SUMMARY OF THE INVENTION

With the foregoing and other objects in view, there is provided, in accordance with the invention, a replaceable multi-tipped electrosensitive printing stylus and novel connector, both of modular construction. A print head module is composed of one or more sets of stylus wires of tungsten or similar metal. The stylus wires of each band is held in spatial relationship by an integral, substantially rectangular and nonconductive molded housing of inverted "U" shaped cross section, each leg of the "U" being a mounting clip. Sets of stylus wires run laterally through each leg of the inverted "U" cross section so that both ends of each set of stylus wires are exposed and form two writing tips for contacting the electrosensitive paper. Thus, when the writing tips on one side wear out, the position of the module may be reversed, exposing the second set of writing tips. The middle portion of the stylus wires are also exposed and, when mounted on the modular connector, are in electrical, spring-pressure contact therewith.

The modular connector is formed of alternating conductive wafers and, insulating wafers or multiples of insulating wafers corresponding to the desired spacing of the stylus wires. The alternating conductive wafers and insulating wafers are bonded together by means of an epoxy-filled central core, created by aligning holes of varying shape that are respectively formed in each wafer. The result is a rigid structure in which each wafer is internally edge-bonded and keyed, or interlocked to the next wafer by virtue of the resulting shape of the epoxy filled core. The electrical connection between a stylus wire and a conductive wafer is effected by two spring tabs provided on each wafer. The connection between a conductive wafer and a drive circuit board is made by means of solderable tabs provided on the conductive wafers.

Another feature of the invention is to provide a versatile stylus assembly of modular construction for printing on electrosensitive paper so that one modular segment may be used as a print head in the typewriter fields, and a linear series of modular segments may be used as a print head bank in the printer fields.

A further feature of the invention of the instant application is to provide a modular means of interconnection of individual stylus wires, so that a maximum amount of stylus wire may be available for printing and a minimum used for interconnection.

BRIEF DESCRIPTION OF THE DRAWINGS

Other features which are considered as characteristic for the invention are set forth in the appended claims.

Although the invention is illustrated and described herein as embodied in a modular stylus assembly, it is nevertheless not intended to be limited to the details shown, since various modifications and structural changes may be made therein without departing from the spirit of the invention and within the scope and range of equivalents of the claims.

Figure 1:
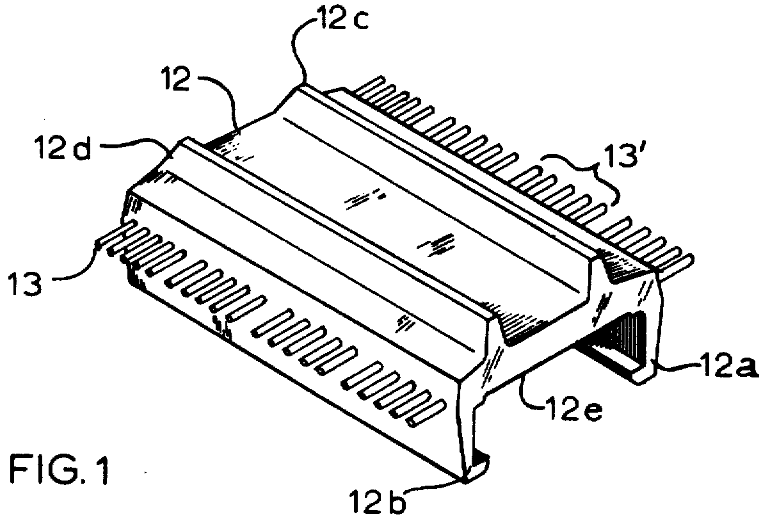
Figure 2:
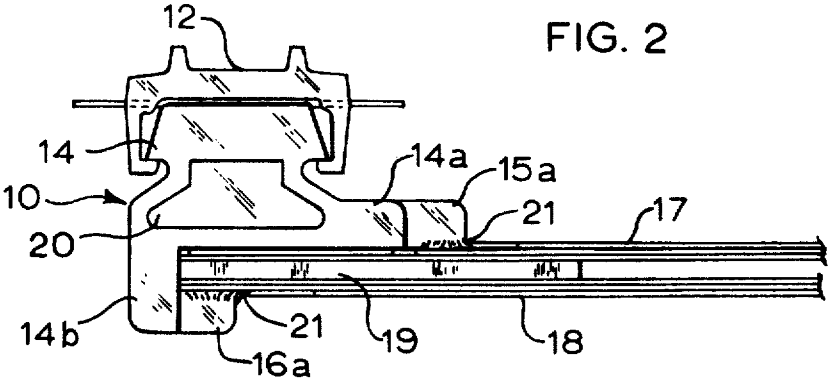
Figure 3:
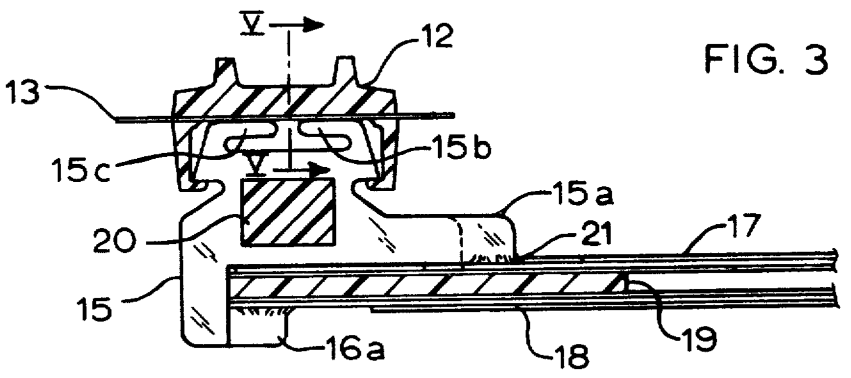
Figure 4:
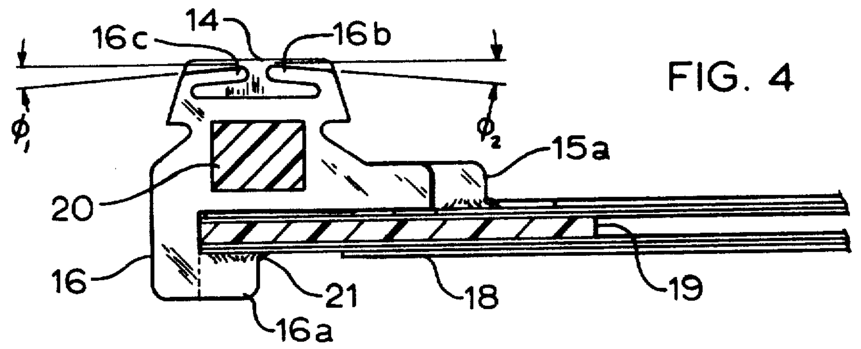
Figure 5:
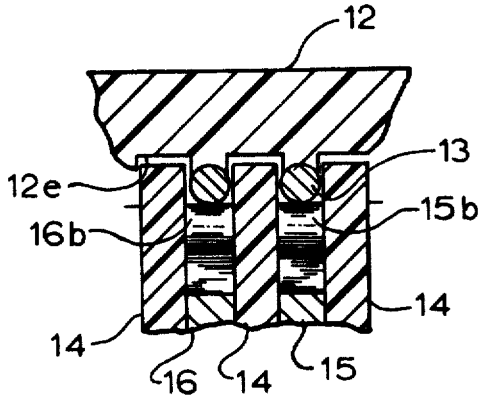
Figure 7:
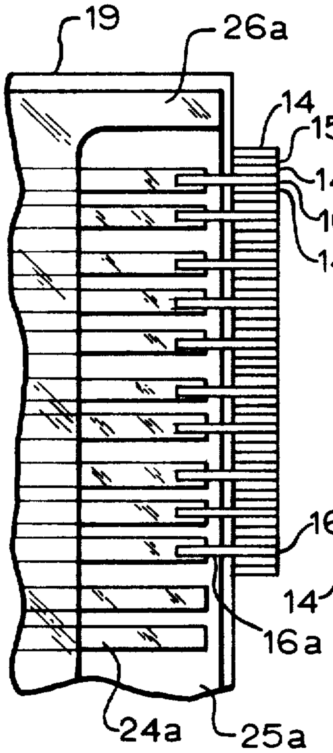
Figure 6:
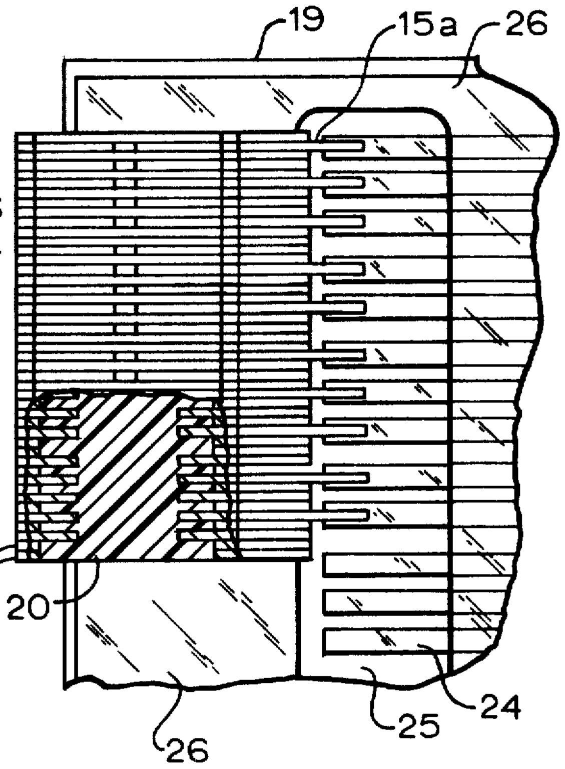
Figure 8:
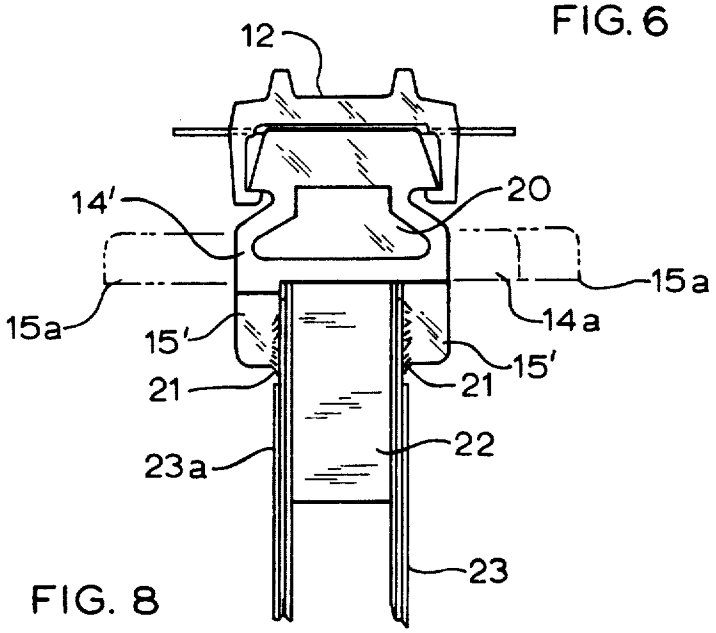

The construction and method of operation of the invention, however, together with additional objects and advantages thereof will be best understood from the following description of specific embodiments when read in connection with the accompanying drawings, in which:

FIG. 1 is a perspective view of a one-piece molded stylus module, having four sets of writing tips, each set consisting of five wires;

FIG. 2 is a side elevational view of the stylus module of FIG. 1 mounted on a connector assembly which is, in turn, mounted on two etched flexible circuit member or circuit boards;

FIG. 3 is a view similar to that of FIG. 2, and partly in section, showing a typical conductive wafer for connecting stylus wires to the upper side of a circuit board or flexible circuit member;

FIG. 4 is a view similar to that of FIG. 2 with the stylus module removed and showing a typical conductive wafer for connecting stylus wires to the underside of a circuit board or flexible circuit member;

FIG. 5 is an enlarged fragmentary sectional view of FIG. 3 taken along the line V—V and showing the contact between the stylus wires and spring tabs of the conductive wafers;

FIG. 6 is a fragmentary top plan view of a wafer stack mounted on a flex circuit or flexible printed circuit strip, and partly broken away to show the epoxy-filled central core;

FIG. 7 is a bottom view of the fragmentary wafer stack of FIG. 6 and showing the connection of appropriate conductive-wafer solder tabs to the bottom of the flexible circuit strip; and FIG. 8 is a side elevational view of an alternate method of mounting the wafer stack.

PREFERRED EMBODIMENT

Referring now to FIG. 1, where is shown a stylus module 12 of the invention of the instant application. The module 12 is molded, in one piece, of an insulating plastic material such as nylon. The molding die utilizes continuous wire inserts. Long lengths of stylus wires 13, as many as are required for the number of stylus positions, are guided into the molding die. After molding, the module 12 and wires 13 are indexed a pre-set distance, the wires 13 are repositioned in the die, and the process of molding repeated so that successive modules 12 are molded of the same lengths of wires 13. Protruding stylus wires 13, between successive modules 12 are then cut to proper length. After cutting, the stylus wire tips are honed smooth to remove any burrs caused during trimming. Two side lugs 12*a* and 12*b*, extend along the entire length of the module 12 and are undercut to provide a snap-fit joint between the module 12 and a connector module 10 (FIG. 2). Two ribs 12*c* and 12*d*, are provided across the top of the module 12 and serve as a gripping surface for easier handling. Although the module 12 shown in FIG. 1 has four writing tips, a convenient module length is eight tips.

The underside of the center span 12*e* of the module 12 is transversely slotted on both sides of each stylus wire 13 so that the lower half of each stylus wire 13 is exposed and able to make contact with respective spring tabs 15*b*, 15*c* and 16*b*, 16*c* (FIGS. 3 and 4) of the connector module 10 which will be described hereinafter in greater detail with respect to FIGS. 3, 4 and 5.

The module 12 shown in FIG. 1 is used to print character-lines of alphanumeric information in a seven-row by five-column matrix. When the modules 12 are mounted linearly, each writing tip 13' contains five stylus wires. Each writing tip 13' prints a one-dot wide dot-line, normally a horizontal line. When the printing of each dot-line is sequenced with a seven-step vertical movement of the paper, a series of five by seven alphanumeric dot matrices or character-lines is printed. Stylus wires of tungsten are 7 mill diameter on 18 mill centers, each group of five wires are on 100 mill centers. The resulting printed characters are approximately 79 mills wide by 100 mills high, on 100 mill centers. Character lines of any length may be obtained by adding styli and connector modules.

Another configuration for alphanumeric character printing along with graphic and facsimile generating may be achieved by changing the spacing of the stylus wires from groups of five to an even spacing, so that a continuous dot-line may be generated.

A third variation of the stylus shown in FIG. 1 is usually alone and not in modular configuration. A single set of writing tips composed of nine evenly spaced stylus wires is used to print alphanumeric characters, one column at a time. Each character column is a matrix of seven-rows by five columns. The two extra rows are provided for an offset when lower case letters are printed. Printing and moving the paper or the print head five steps, generates characters 80 mills wide by 103 mills high. Character spacing and, to some extent, character width are optional. Character size in this case assumes stylus wire diameters of 7 mills on 16 mill centers.

Referring to FIG. 2, there is shown a stylus module 12 mounted on a connector module 10, which is formed of alternating conductive wafers 15 and 16 and insulating wafers 14. The conductive wafers 15 and 16 are soldered at 21 to the conductors of conventional flexible printed circuit strips 17 and 18 through the aid of solder tabs 15*a* and 16*a*. Flexible circuit strips 17 and 18 are bonded to a hardboard reinforcement 19. The insulating wafer 14 may be fabricated as a stamping of mylar or similar material. A typical thickness of the insulating wafer 14 is 10 mills. A tab 12*a* is necessary for providing support to the relatively lengthy adjacent solder tab 15*a* of the conductive wafer 15. The hardboard reinforcement 19 should be fabricated of an insulating material such as phenolic, glass-reinforced epoxy, or similar material.

A central epoxy fill 20 extending through aligned apertures formed, respectively in a stack of the wafers 14, 15 and 16 serves to bond the stack together. In addition to bonding, keying and providing structural support, the central epoxy fill 10 eliminates the general problems encountered with conventional laminating procedures.

FIG. 3 shows the conductive wafer 15 with the solder tab 15*a* thereof, the spring tabs 15*b* and 15*c* of the wafer 15 being visibly in contact with a stylus wire 13. The conductive wafers 15 and 16 may be fabricated as stampings of beryllium copper or phosphor bronze, or similar material. To effect a proper fit, the thickness of a conductive wafer 15, 16 should be slightly greater than the diameter of a stylus wire 13. For example, when 7-mill stylus wire 13 are desired, the conductive wafers 15 and 16 should be each 8 mills thick. This is readily apparent in the fragmentary sectional view of FIG. 5.

The conductive wafer 16 is shown in FIG. 4 with the stylus module 12 removed. The spring tabs 16*b* and 16*c* are identical to the spring tabs 15*b* and 15*c* of the conductive wafer 15 but are shown unloaded in FIG. 4. The spring effect is achieved by the upwardly sloping top surfaces indicated by angles $\phi 1$ and $\phi 2$ in FIG. 4. When a stylus module 12 is in operating position, the spring tabs 15*b*, 15*c*, 16*b*, 16*c* are forced from the position thereof shown in FIG. 4 into a horizontal position as shown in FIG. 3, thus maintaining a constant spring pressure contact between the respective stylus wire 13 and the respective conductive wafer 15, 16.

FIGS. 6 and 7 are fragmentary top and bottom views of a connector stack. The resulting configuration of the central epoxy filled core 20 is visible in the broken-away portion of FIG. 6. This cavity in which the epoxy core 20 is disposed results from the aligned triangular or square recesses respectively, of the adjacent wafers 14, 15 and 16. Conductors 24 and 24*a* are of copper, approximately 2 mills thick. Conductor width and spacing may vary but typical conductor widths are 20 mills, and the spacing therebetween is 12 mills. As may be seen, conductor width and spacing is directly related to conductive wafer spacing which, in turn, is related to the desired stylus spacing and current-carrying requirements. The flexible printed circuit strip or base film 25 and 25*a* may be of 2 mill-thick KAPTON, a registered trademark, polyamide film or any of a variety of similar materials. The coverlay material 26 and 26*a* may be of polyester, however, the coverlay 26 must be the same thickness as that of the conductor 24. This is necessary because the coverlay material 26 is also used as a spacer to keep the wafer stack level with the surface of the conductor 24. Such a requirement is not encountered on the bottom side of the wafer stack shown in FIG. 7, nor does such a requirement exist for the vertical-mounting configuration of FIG. 8. For additional strength of the entire structure, the wafer stack, prior to soldering may be bonded to the coverlay 26 which is, in turn, bonded to the base film 24, in turn, further bonded to the hardboard support 19. A variety of conventional adhesives are available for this application.

FIG. 8 shows a variation of the connector assembly that may be used in a vertical-mounting configuration. The assembly of FIG. 8 is similar to the horizontal-mounting connector shown in FIG. 2, except that the conductive wafer 16 is not required, the solder tab 15*a* of the conductive wafer 15 is removed, and the support tabs 14*a* and 14*b* of the insulating wafer 14 are removed. The wafer stack of FIG. 8 thus is formed of alternating modified conductive wafers 15' and modified insulating wafers 14'. The conductive wafers 15' of FIG. 8 are alternately reversed in direction so that solder contact at 21 may be made with both circuits 23 and 23*a*. The conductors on flexible circuit 23 are symmetrically spaced so that the flexible circuit 23 and 23*a* are the same. The insulating hardboard support member 22 in this configuration of FIG. 8 is substantially stronger than in the horizontal configuration of FIG. 2.

What is claimed:

1. A modular stylus assembly for printing alphanumeric or pictorial patterns on electrosensitive sheets comprising, in combination, a print-head module having a first wall, a pair of spaced second walls extending from said first wall and defining a channel therebetween, and a multiplicity of stylus wires extending rectilinearly and in parallel alignment through said second walls and within said channel alongside said first wall, and a connector module receivable in said channel and comprising a multiplicity of alternating electrically conductive and electrically insulating wafers respectively disposed in planes extending through said pair of spaced second walls, said electrically conductive wafers being spaced from one another by said electrically insulating wafers a distance corresponding substantially to the spacing between said parallel stylus wires whereby the electrically insulating wafers of a connector module received in said channel are respectively in electrically conductive engagement with said stylus wires, said connector module having means for selectively electrically energizing said electrically conductive wafers and said stylus wires.

2. Modular stylus assembly according to claim 1 wherein said second walls have inwardly extending projections at the free ends thereof and are yieldable so that said projections are movable away from one another to provide clearance for a portion of said connector module to be received in said channel, and so that said projections are movable toward one another to permit engagement of said projections in corresponding recesses formed in said connector module adjacent said portion thereof.

3. Modular stylus assembly according to claim 1 including means for effecting spring-pressure contact between said electrically conductive wafers and the respective stylus wires, said last mentioned means comprising resilient tab projections provided at a free end of said electrically conductive wafers received in said channel and disposed in biasing contact with said stylus wires, respectively.

4. Modular stylus assembly according to claim 1 wherein said multiplicity of stylus wires extend from said print-head module outside of both of said second walls so as to form two sets of equally operable writing tips, said print-head module being mountable on said connector module so tht either of said sets of writing tips is alternatively in position for printing on an electrosensitive sheet.

5. Modular stylus assembly according to claim 1 wherein said wafers are formed with respective substantially central cutouts alignable one with the other so as to form a bore within said connector module, and including a substantially central core received in said bore and bonding said wafers together.

6. Modular stylus assembly according to claim 5 wherein the cutouts of said wafers are of varying shape.

7. Modular stylus assembly according to claim 1 wherein said selective energizing means comprise respective solderable tabs provided on said electrically conductive wafers and respective solder connections of said solderable tabs to selectively energizable conductors.

8. Modular stylus assembly according to claim 7 wherein said selectively energizable conductors are formed on flexible printed-circuit strips.

9. Modular stylus assembly according to claim 8 wherein said solderable tabs of said electrically conductive wafers extend in direction substantially parallel to said stylus wires and laterally beyond said electrically insulating wafers, and said flexible printed-circuit strips are disposed adjacent and substantially parallel to said solderable tabs.

10. Modular stylus assembly according to claim 8 wherein said solderable tabs of said electrically conductive wafers extend in direction transverse to said stylus wires and beyond said electrically insulating wafers, and said flexible printed-circuit strips are disposed adjacent and substantially parallel to said solderable tabs.

11. Modular stylus assembly according to claim 1 including a plurality of said print-head modules disposed adjacent and in linear alignment with one another for simultaneously printing a line of respective parts of a multiplicity of the patterns on an electrosensitive sheet.

* * * * *